United States Patent
Saito et al.

(10) Patent No.: US 7,930,743 B2
(45) Date of Patent: Apr. 19, 2011

(54) INFORMATION PROCESSING SYSTEM, INFORMATION PROCESSING METHOD, INFORMATION PROCESSING PROGRAM, COMPUTER READABLE MEDIUM AND COMPUTER DATA SIGNAL

(75) Inventors: Kazuo Saito, Tokyo (JP); Mitsuhisa Kamei, Tokyo (JP); Hiroyuki Ishima, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 559 days.

(21) Appl. No.: 11/846,940

(22) Filed: Aug. 29, 2007

(65) Prior Publication Data

US 2008/0060072 A1 Mar. 6, 2008

(30) Foreign Application Priority Data

Sep. 1, 2006 (JP) .................................. 2006-237124

(51) Int. Cl.
*G06F 11/00* (2006.01)
*G06F 12/14* (2006.01)
*G06F 12/16* (2006.01)
*G08B 23/00* (2006.01)

(52) U.S. Cl. .......... 726/22; 713/152; 713/167; 713/189; 713/187; 380/251; 726/4; 726/17; 726/21; 717/124

(58) Field of Classification Search .................. 713/189; 726/22
See application file for complete search history.

(56) References Cited

U.S. PATENT DOCUMENTS

| | | | |
|---|---|---|---|
| 5,699,512 A | 12/1997 | Moriyasu et al. | |
| 6,237,137 B1 | 5/2001 | Beelitz | |
| 6,874,087 B1 | 3/2005 | Fetkovich et al. | |
| 7,149,900 B2 * | 12/2006 | Rothrock | 713/189 |
| 2004/0040013 A1 | 2/2004 | Kalra | |
| 2004/0123122 A1 | 6/2004 | Asai et al. | |
| 2006/0117314 A1 * | 6/2006 | Sato | 717/174 |
| 2006/0143446 A1 | 6/2006 | Frank et al. | |
| 2008/0168562 A1 | 7/2008 | Haga et al. | |

FOREIGN PATENT DOCUMENTS

| | | |
|---|---|---|
| JP | 07-013780 A | 1/1995 |
| JP | 8-016385 A | 1/1996 |
| JP | 11-175336 A | 7/1999 |
| JP | 3033562 B2 | 2/2000 |
| JP | 2003-337629 A | 11/2003 |
| JP | 2004/086910 A | 3/2004 |
| JP | 2004-185064 A | 7/2004 |
| JP | 2005018725 A | 1/2005 |
| WO | 2004/053666 A1 | 6/2004 |

(Continued)

OTHER PUBLICATIONS

Australian Office Action dated Dec. 12, 2008, in application No. 2007211962.

(Continued)

*Primary Examiner* — Matthew B Smithers
*Assistant Examiner* — Shewaye Gelagay
(74) *Attorney, Agent, or Firm* — Sughrue Mion, PLLC (57) ABSTRACT

An information processing system includes a monitoring program starting unit and a protection target program monitoring unit. When a protection target program to be protected is started, the monitoring program starting unit starts a monitoring program that monitors the protection target program. The protection target program monitoring unit monitors the protection target program by the monitoring program.

5 Claims, 8 Drawing Sheets

FOREIGN PATENT DOCUMENTS

| | | |
|---|---|---|
| WO | 2004/072891 A2 | 8/2004 |
| WO | 2006/090800 A1 | 8/2006 |

OTHER PUBLICATIONS

Reverse Code Engineering RCE Forums, "Theory Behind Debugging Process Request—Armadillo", RCE Forums, Sep. 2005, XP002601517 URL: Http//www.woodmann.com/forum/archive/index.php/t-9016.html, retrieved on Sep. 21, 2010.

Shub-Nigurrath et al, "Cracking with Loaders: Theory, General Approach, and a Framework" Codebreakers Magazine, Jan. 2006, pp. 1-60, vol. 1, XP007914919.

Partial European Search Report issued Oct. 21, 2010 in counterpart European Application No. 07016935.4.

* cited by examiner

INFORMATION PROCESSING SYSTEM, INFORMATION PROCESSING METHOD, INFORMATION PROCESSING PROGRAM, COMPUTER READABLE MEDIUM AND COMPUTER DATA SIGNAL

CROSS-REFERENCE TO RELATED APPLICATIONS

This application is based on and claims priority under 35 U.S.C. §119 from Japanese Patent Application No. 2006-237124 filed on Sep. 1, 2006.

BACKGROUND

1. Technical Field

The invention relates to an information processing system, an information processing method, an information processing program, a compute readable medium storing the information processing program and a computer data signal.

2. Related Art

In a relate art, for the purse of security, data and a program are encrypted.

However, there is such a danger that a third party analyzes the encrypted data or encrypted programs to steel the data. Thus, it is required to protect data and programs from such access. Against acts such as falsification caused by analyzing programs, there is a technique, called a "software tamper-resistant technique" or an "obfuscation technique," which prevents such acts (making it difficult to analyze the program) mainly by software.

SUMMARY

According to an aspect of the invention, a computer-readable medium stores a program that causes a computer to execute information processing. Monitoring of a certain program is executed only by a single program. The information processing includes: when a protection target program to be protected is started, starting a monitoring program that monitors the protection target program; and monitoring the protection target program by the monitoring program.

BRIEF DESCRIPTION OF THE DRAWINGS

Exemplary embodiments of the invention will be described in detail below with reference to the accompanying drawings wherein.

DETAILED DESCRIPTION

First, in order to facilitate understanding of exemplary embodiments, the operating environment of a debugger and its operation will be described. Here, the term "debugger" means a program for debugging a certain program, and the term "debuggee" means a program to be debugged. Generally, the debugger is a software tool that is used during program development and that is utilized to check the behavior of the program. Further, the debugger is a monitoring program that monitors the behavior of another program. Further, the expression "a program monitors another program" means "a program operates as a debugger of another program."

Figure 2:
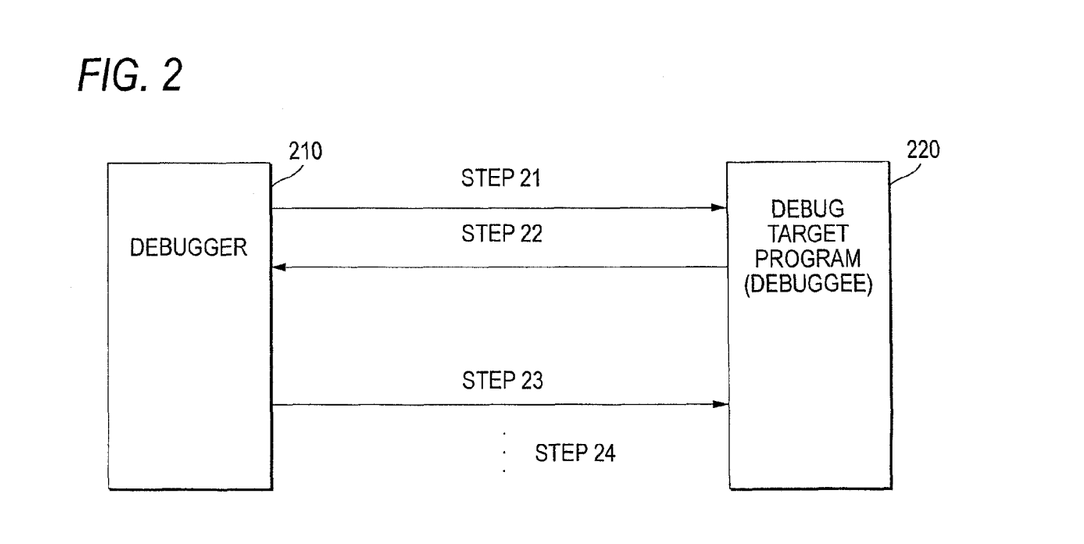
FIG. 2 is an explanatory view showing a relationship between a debugger and a debuggee.

FIG. 2 is an explanatory view showing a relationship between a debugger and a debuggee. It is assumed that both a debug target program 220 (debuggee) and a debugger 210 that is a program for debugging the debug target program 220 are running on an operating system (OS) of a certain computer.

In Step 21, the debugger 210 creates a process using the debug target program 220 as a debug target, or is attached to an existing process as a debugger. Here, the term "attach" means that monitoring of the behavior of a currently-running process is started. Further, the term "detach" means that a state where the behavior of a process is monitored is released (finished).

That is, the debugger 210 starts the debug target program 220. At this time, the debugger 210 calls API (Application Program Interface) of OS and specifies a parameter to start API so that the debugger 210 can act as a debugger of the debug target program 220.

For example, in Windows®, an API function "CreateProcess( )" is used, and a "DEBUG_PROCESS" flag is specified as an argument. Thereby, while the debug target program 220 is in a suspended state, a process is created. The process (debug target program 220) that is already running can also be debugged. In this case, API for attaching a debugger to the existing process is called. In Windows, an API function is DebugActiveProcess( ), and when the debugger 210 is attached, the debug target program 220 is notified of an event and its operation is suspended.

In Step 22, if an event (creation of a breakpoint or creation of a thread, etc.) occurs in the debug target program 220, the debug target program 220 will notify the debugger 210 of the event.

That is, if an event such as executing a breakpoint (used to suspend a currently-running program in a specific address) that is set by the debugger 210, changing content of a specific memory address or creating another process and another thread occurs in the debug target program 220, the debug target program 220 notifies to the debugger 210 that the event has occurred (actually, the event is notified from the debug target program 220 not directly, but via OS). Upon the notification of the event, execution of the debug target program 220 is suspended there. In Windows, if the debugger 210 calls an API function WaitForDebugEvent( ), and if an event is notified to the debugger itself, the debugger 210 can receive the content of the notification.

In Step 23, the debugger 210 acquires and displays a state of the debug target program 220. Thereafter, the debugger rewrites (sets a breakpoint, changes the content of a memory, etc) the internal state of the debug target program 220 according to a user's instruction, and continues the process.

That is, the debugger 210 receives a notification indicating that an event has occurred in the debug target program 220, acquires the content of a memory in the debug target program 220 and the content of a register at the time of interruption, displays the contents in such a form that a user can understand, and waits for a next instruction from the user. The user changes the content of the memory or register, and if necessary, newly sets a breakpoint. Then, the user resumes execution of the debug target program 220. In Windows, API functions "ReadProcessMemory/WriteProcessMemory" are used to read/write the content of a memory. An API function "VirtualProtectEx( )" is used to rewrite attributes (reading/writing/execution) of a memory. API functions "GetThreadContext/SetThreadContext" are used to read/write the content of a register. A breakpoint is set by substituting execution of an address to be interrupted with a break command. An API function "ContinueDebugEvent( )" is used to resume execution of the debug target program 220.

In Step 24, processing of Step 22 to Step 23 is repeated until the debug target program 220 is finished or the debugger 210 interrupts the processing.

In this way, the debugger 210 can monitor the behavior of the debug target program 220 as debugging. Accordingly, it is also conceivable that the debugger 210 is used not for the debugging, but for interpretation of the behavior of a program which has been obfuscated. In the related art, it is possible to analyze a portion that detects a debugger. But, this is not a method of preventing analysis act itself by a debugger.

Next, in order to further facilitate understanding of the exemplary embodiments, a fundamental idea will be described.

The exemplary embodiments described later utilize such a feature of debugging APIs that are supported by an OS (Operating System, for example, Windows®, Linux®, etc) that only a single process becomes a debugger for a specific process.

The debugging APIs are generally APIs that are prepared in advance for OS in order to assist debugging of programs. A function that renders a certain process (program) become a debugger of another process (program) is prepared. Normal debugging functions that development environment has are realized using these debugging APIs.

On the other hand, in the debugging APIs, only a single debugging process can serve as a debugger of a certain process. This is because, if plural processes can function as debuggers, consistency in a status of a debuggee would be lost (and simultaneously, the content of a memory is changed by plural debuggers). The debugging APIs have this property irrespective of the type of OS.

Thus, in order to prevent analysis by a debugger, a process that operates as a debugger for a process to be protected (protection target process) is set in advance so that it makes impossible for an attacker who intends to attack the protection target process to analyze the debugger.

That is, the basic idea is that a process that is a so-called dummy debugger is started for a program to be protected from analysis by an attacker so that, even if the attacker tries to analyze the target program by a debugger, the program cannot be debugged. In addition, the reason why we call the "dummy debugger" is that the dummy debugger does not exist for an original debugging function.

Figure 1:
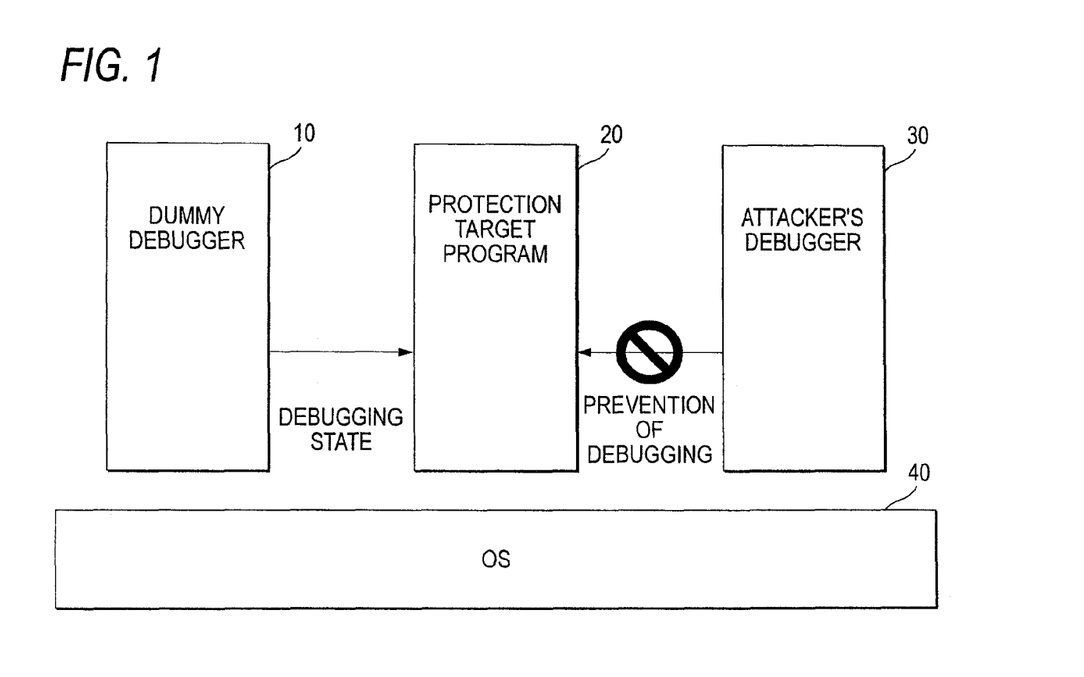
FIG. 1 is a block diagram showing an exemplary configuration of a whole system.

This will be described with reference to FIG. 1. On an OS 40, only one debugger can be created for a protection target program 20, and two or more debuggers cannot be created for the protection target program 20. Thus, even if an attacker who tries to analyze the protection target program 20 tries to generate a attacker's debugger 30 which monitors the behavior of the protection target program 20, the dummy debugger 10 is created before such action and the dummy debugger 10 is debugging the protection target program 20. Therefore, the protection target program 20 can be prevented from being monitored by the attacker's debugger 30.

Moreover, there are various exemplary embodiments which are devised so that, if the dummy debugger 10 does not exist, the protection target program 20 cannot be executed normally. That is, in order to protect a program more strongly, a scheme that one process depends on the other process is introduced.

Figure 3:
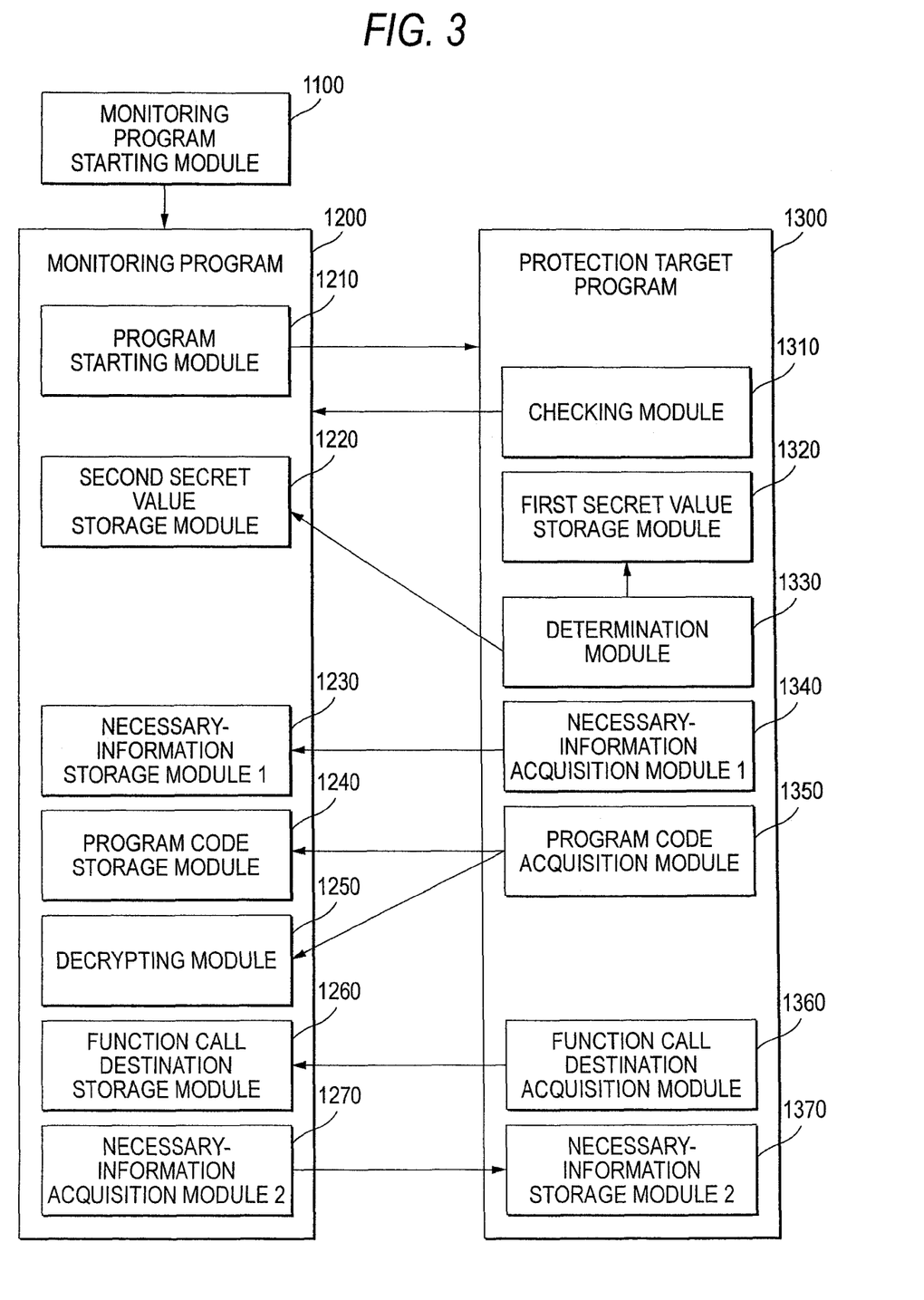
FIG. 3 is a block diagram showing an example of the whole configuration according to exemplary embodiments.

An example of the whole configuration of the exemplary embodiments will be described with reference to FIG. 3. It is noted that a block diagram shown in FIG. 3 is for plural exemplary embodiments, and various exemplary embodiments may be realized using some of this block diagram. Further, it is possible to combine modules shown in FIG. 3 to thereby construct various programs for preventing program analysis and various systems for preventing the program analysis.

Here, the term "module" generally means logically separable software, and components, such as hardware. Accordingly, the module in the exemplary embodiment means not only a module in a program but a module in a hardware configuration. Therefore, the exemplary embodiment also serves to describe a program, a system, and a method. Further, the module corresponds to its function substantially one to one. However, in mounting, one module may be made up of one program or plural modules may be made up of one program. Conversely, one module may be made up of plural programs. Further, plural modules may be executed by one computer or one module may be executed by plural computers in a dispersed or parallel environment. Further, in the following description, the term "connection" includes logical connection in addition to physical connection.

Further, the term "system" also includes the case where it is realized by one computer besides the configuration in which plural computers, plural hardware, plural apparatuses, etc. are connected together over a network.

As shown in FIG. 3, the exemplary embodiment mainly has a protection target program 1300 to be protected from attacker's analysis, a monitoring program 1200 that monitors the protection target program 1300, and a monitoring program starting module 1100 that starts the monitoring program 1200.

The monitoring program starting module 1100 starts the monitoring program 1200 that monitors the protection target program 1300 when the protection target program 1300 that is a protection target is started. Here, when the protection target program 1300 is started, it does not matter either of the protection target program 1300 or the monitoring program 1200 is first started. That is, the monitoring program 1200 has to be started before an attacker's debugger API is created. When the monitoring program 1200 is started ahead of the protection target program 1300, the monitoring program 1200 may start the protection target program 1300. On the contrary, when the protection target program 1300 is started ahead of the monitoring program 1200, the monitoring program 1200 may be attached to the protection target program 1300.

A program starting module 1210 in the monitoring program 1200 causes the monitoring program 1200, which has been started by the monitoring program starting module 1100, to start the protection target program 1300 or to attach to the protection target program 1300.

A checking module 1310 in the protection target program 1300 checks as to whether or not the monitoring program 1200 has started. Further, the checking module 1310 may check as to whether or not the monitoring program 1200 is monitored by another monitoring program.

A first secret value storage module 1320 in the protection target program 1300 stores a secret value.

A second secret value storage module 1220 in the monitoring program 1200 stores a secret value that is the same value as the secret value stored by the first secret value storage module 1320 in the protection target program 1300.

A determination module 1330 in the protection target program 1300 determines as to whether or not the secret value stored by the second secret value storage module 1220 is the same as the secret value stored by the first secret value storage module 1320.

A necessary-information storage module 1230 in the monitoring program 1200 stores information that is necessary for the protection target program 1300 to continue processing.

A necessary-information acquisition module 1-1340 in the protection target program 1300 acquires the necessary information stored by the necessary-information storage module 1-1230.

A program code storage module 1240 in the monitoring program 1200 stores a program code that is missing as a program code of the protection target program 1300.

A decrypting module 1250 in the monitoring program 1200 decrypts a program code that a portion of the protection target program 1300 and is encrypted. Here, the decrypting module 1250 may directly decrypt an encrypted code holding section (including not only a program but data, etc.) in the protection target program 1300 as well as receiving an acquisition request from a program code acquisition module 1350 in the protection target program 1300.

The program code acquisition module 1350 in the protection target program 1300 acquires the program code stored by the program code storage module 1240 or the program code decrypted by the decrypting module 1250.

A function call destination storage module 1260 in the monitoring program 1200 stores a function call destination that is a program code or data such as a function table which calls a function via the function call destination.

A function call destination acquisition module 1360 in the protection target program 1300 acquires the function call destination stored by the function call destination storage module 1260.

A necessary-information storage module 2-1370 in the protection target program 1300 stores information that is necessary for the monitoring program 1200 to continue processing.

A necessary-information acquisition module 2-1270 in the monitoring program 1200 acquires the necessary information stored by the necessary-information storage module 2-1370.

Further, the monitoring program 1200 may be monitored by another monitoring program 1200. That is, in order to prevent analysis of the monitoring program 1200 by an attacker, the monitoring program 1200 itself will be in the same position as the protection target program 1300.

Further, the monitoring program 1200 may detach the protection target program 1300, i.e. release monitoring of the protection target program 1300, and the protection target program 1300 may attach to the monitoring program 1200, i.e., may start monitoring. That is, the position of the monitoring program 1200 and the position of the protection target program 1300 are reversed.

Further, the monitoring program 1200 and the protection target program 1300 may be prepared as a single module so that the monitoring program 1200 or the protection target program 1300 may be started according to an argument used when the module is started.

Further, the monitoring program 1200 starts and monitors the protection target program 1300, and the protection target program 1300 attaches to the monitoring program 1200 to monitor the monitoring program 1200. That is, the monitoring program 1200 and the protection target program 1300 may be in the mutually monitoring relationship.

Hereinafter, various exemplary embodiments of the invention will be described with reference to the drawings.

Figure 4:
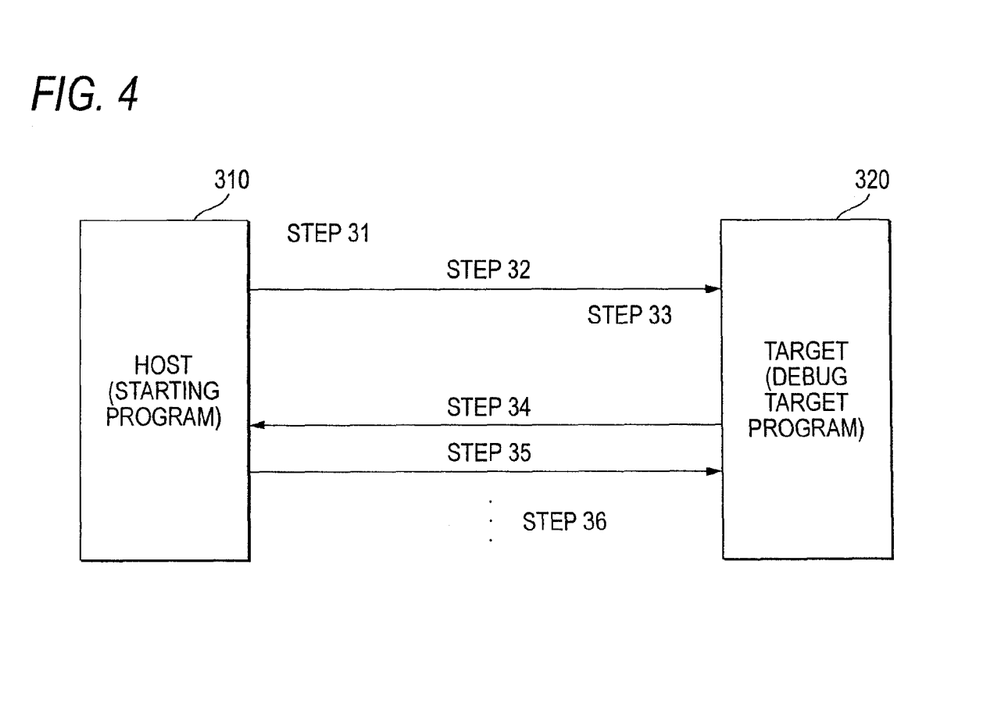
FIG. 4 is a block diagram showing an exemplary configuration of a first exemplary embodiment.

FIG. 4 shows a conceptual module block diagram of a first exemplary embodiment (an example in which a target authenticates a host).

Here, a host 310 corresponds to the monitoring program 1200 of FIG. 3, and a target 320 corresponds to the protection target program 1300 of FIG. 3.

This exemplary embodiment is an example in which the monitoring program (hereinafter referred to as "host") 1200 operates as a debugger, and the protection target program (hereinafter referred to as "target") 1300 operates as a debuggee. The target 320 intermittently monitors existence of the host 310. Here, the term "intermittently" means repeating at certain intervals. The intervals may be regular intervals or random time intervals.

The procedure of execution of programs will be shown below.

In Step 31, the host 310 is started by a user.

In Step 32, the host 310 creates a process of the target 320 by using the target 320 as a debug target. That is, the host 310 starts the target 320 as a debug target. Thereafter, the host 310 waits for reception of a debug event from the target 320.

In Step 33, the target 320 creates a new thread at the head of processing, and checks as to whether or not a process of the host 310 exists in the thread. For example, it is checked every minute as to whether or not a process having an execution file name of a program of the host 310 exists. If the process does not exist, the program of the target 320 is finished.

In Step 34, if an event (creation of a breakpoint or a thread, etc.) occurs in the target 320, the event is notified to the host 310.

In Step 35, if the host 310 receives the event, the host 310 continues the process of the target 320 and waits for a subsequent event, so long as the event is an end event.

In Step 36, Steps 34 to 35 are repeated until the end event of the process is notified from the target 320. If the end event of the process is notified from the target 320, the host 310 will also end the process.

Further, in the above Step 33, it is determined as to whether or not the process of the host 310 is a right host 310, for example, by acquiring a list of currently existing processes from a system (EnumProcess in Windows), acquiring a starting file name for each of the processes (EnumProcessModules in Windows), and by determining as to whether or not the name and attribute of each of the modules are correct. The "attribute" is information about a creator, date, etc. of a file of each module. Specifically, it is hard to prevent attacker's analysis only by authentication on the basis of a file name, for example, when a fake program is replaced for regular program by the same file name on the same path. However, if authentication is performed using attribute information other than a file name as described above, the possibility that the attacker's analysis can be prevented will increase even when such illegal replacement is performed. Further, an electronic signature for a file may be checked. Specifically, in order to prevent illegal analysis, the target 320 authenticates the host 310 by checking a digital signature, and only when the authentication result indicates that the host 310 is right one, processing of the target 320 is caused to continue.

Figure 5:
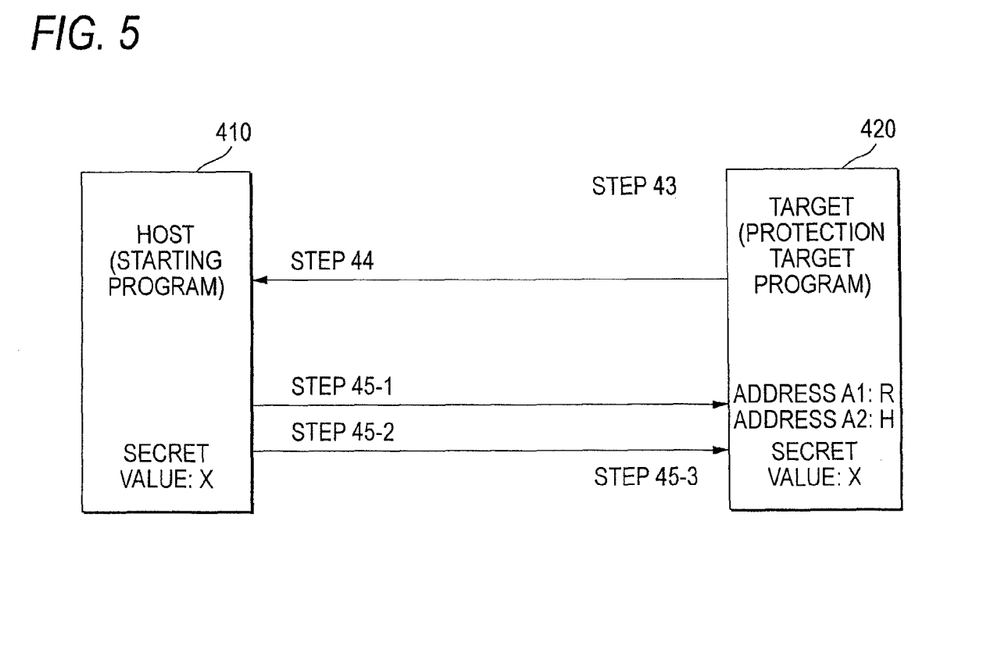
FIG. 5 is a block diagram showing an exemplary configuration of a second exemplary embodiment.

FIG. 5 shows a conceptual module block diagram of a second exemplary embodiment (an exemplary embodiment in which a target authenticates a host by Challenge & Response).

Here, a host 410 corresponds to the monitoring program 1200 of FIG. 3, and a target 420 corresponds to the protection target program 1300 of FIG. 3.

In the second exemplary embodiment, the processing of Step 33 in which the first exemplary embodiment that the target 320 checks as to whether or not the host 310 is regular one is performed by the Challenge & Response. The "Challenge & Response" is a method of sending a certain challenge and checking as to whether or not a response returned from the other party is a right value for the challenge, thereby verifying (checking) as to whether or not the other party is right one. For example, a certain secret byte sequence is shared, a random number is created at the time of verification, and the random number is sent to the other party as a challenge. The other party calculates a value obtained by giving a value resulting from concatenation of the secret value and the random number to a one-way hash function (SHA1, etc.), and returns the calculated value as a response. Upon reception of the response, it is checked as to whether or not the values coincide with each other by performing the same calculation. This method can authenticate that the other party is right so long as a secret value is leaked to others.

In this exemplary embodiment, this method is applied to the first exemplary embodiment. Specifically, Steps 33 to 35 of the first exemplary embodiment are changed to the following Steps 43 to 45-3. Step 36 is also used in the second exemplary embodiment. In addition, ahead of this, it is assumed that the host 410 and the target 420 share an address A1 that stores a secret value X that is secret 20-byte data and a created random number R and an address A2 that stores a response. In addition, although the addresses A1 and A2 may be similarly used in other exemplary embodiments, those addresses may not be expressly mentioned in the other exemplary embodiments for simplicity of description.

In Step 43, the target 420 creates the random number R to generate a debug break. That is, the target 420 creates a new thread at the head of processing. The thread performs the following processing intermittently (or may perform the following processing regularly, for example, every one minute). The random number R is created, this number is set in a specific predetermined address, and a debug break is generated.

In Step 44, execution of the target 420 is interrupted, and a debug break event occurs and is notified to the host 410.

In Step 45-1, when the host 410 receives a notification of an event and this event is a debug break event, the host 410 reads the data R from a specific address A1 of the target 420, concatenates a value of the data R with a secret value X that is held by the host 410 itself, and obtains a hash value H (SHA1, etc.). Then, the host 410 writes the hash value to a specific address A2 of the target 420.

In Step 45-2, the host 410 increments a program counter by one so that a debug break command is not be repeated in a process of the target 420, and continues the process of the target 420. If the received event is an end event, the process proceeds to Step 36. Otherwise, the host 410 continues the process of the target 420 without doing anything, and waits for a subsequent event.

In Step 45-3, the target 420 that has received an instruction of continuing execution from the host 410 subsequently concatenates a secret value X that is held by the target 420 itself with the random number R stored in the address A1, and obtains a hash value H'. Then, the target 420 checks as to whether or not the hash value coincides with the value stored in the address A2. If the values don't coincide with each other, the target 420 ends the process.

In addition, in the second exemplary embodiment, a debug break event is used to transmit/receive data between the host 410 and the target 420. Thus, when the host 410 creates a process of the target 420, the process should be created by specifying a parameter so that the debug break event can be received.

Further, although the case where authentication is performed using secret data and a secret hash function is described in the second exemplary embodiment, similar authentication processing may be performed by a digital signature. Further, other kinds of events (creation of a thread, etc.) may be used instead of a debug break event.

Figure 6:
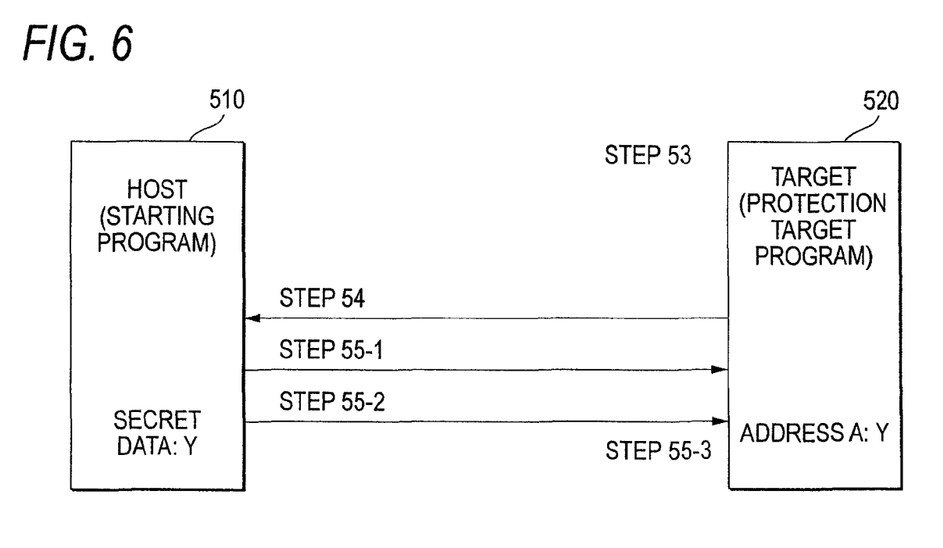
FIG. 6 is a block diagram showing an exemplary configuration of a third exemplary embodiment.

FIG. 6 shows a conceptual module block diagram of a third exemplary embodiment (an example where a host holds a portion of data of a target).

Here, a host 510 corresponds to the monitoring program 1200 of FIG. 3, and a target 520 corresponds to the protection target program 1300 of FIG. 3.

In the previous exemplary embodiment, a target only performs authentication processing of a host, and the host has nothing to do with the original processing that the target should perform. In the third exemplary embodiment, assistance of a host is required in order to continue processing of a target program.

Here, described will be an example where, the host 510 holds a certain kind of data which is indispensable for a target 520 to perform processing, and when processing of the target 520 is performed, the host 510 gives the data to the target 520.

In the third exemplary embodiment, Steps 43 to 45-3 of the second exemplary embodiment are changed to the following Steps 53 to 55-3. Step 36 is also used in the third exemplary embodiment. In addition, it is assumed that secret data Y which is necessary for processing is not held in advance in a program of the target 520.

In Step 53, when it becomes necessary to acquire the secret data Y, which is indispensable to continue the original processing, the target 520 generates a debug break.

In Step 54, execution of the target 520 is interrupted, and a debug break event occurs, and the debug break event is notified to the host 510.

In Step 55-1, if the host 510 receives an event and the received event is a debug break event, the secret data Y that is held only by the host 510 is set in a specific address A of the target 520.

In Step 55-2, the host 510 increments a program counter by one so that a debug break command is not be repeated in a process of the target 520, and the host continues the process of the target 520. If the received event is an end event, the process proceeds to Step 36. Otherwise, the host 510 continues the process of the target 520 without doing anything, and waits for a subsequent event.

In Step 55-3, the target 520 that has received an instruction of continuing execution from the host 510 acquires the secret data Y stored in the address A to continue the original processing.

The target 520 discards the secret data Y immediately after it has been used. Thereby, it becomes necessary to acquire a value from the host 510 whenever required.

The case where the secret data is only Y is described above. However, also conceivable is a method in which the host 510 holds plural kinds of secret data and the target 520 specifies and acquires necessary data. In this case, the host 510 holds a set of an identifier (number) of data and a value of the data. Also, the third exemplary embodiment may be configured so that the identifier (number) of the data is set in a certain address instead of the random number R of the second exemplary embodiment, a debug break event is created, and the host 510 sets data corresponding to the identifier in the address A of the target 520.

Figure 7:
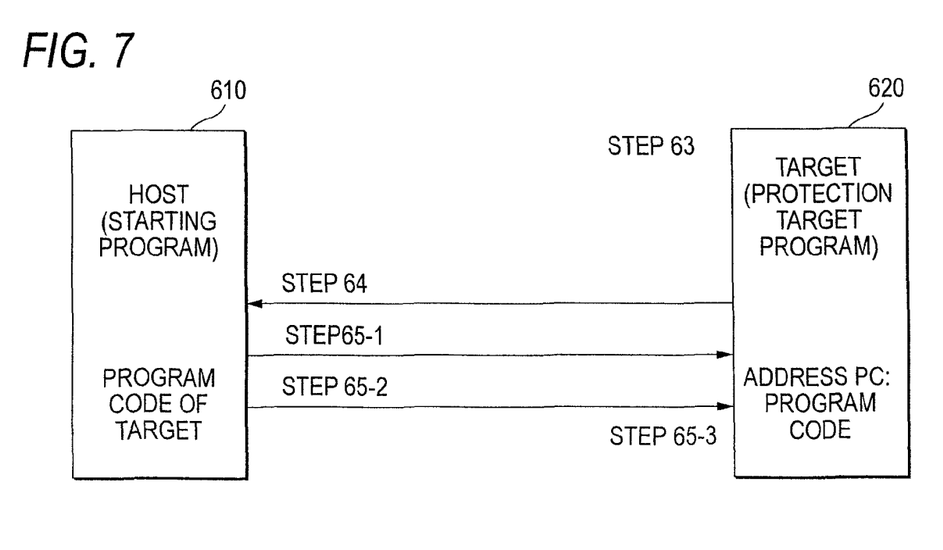
FIG. 7 is a block diagram showing an exemplary configuration of a fourth exemplary embodiment.

FIG. 7 shows a conceptual module block diagram of a fourth exemplary embodiment (an example where a host holds some of program codes of a target).

Here, a host 610 corresponds to the monitoring program 1200 of FIG. 3, and a target 620 corresponds to the protection target program 1300 of FIG. 3.

The fourth exemplary embodiment is an example in which a host side holds some of program codes which perform the processing and which a target should have.

In the fourth exemplary embodiment, Steps 53 to 55-3 of the third exemplary embodiment are changed to the following Steps 63 to 65-3. Step 36 is also used in the fourth exemplary embodiment. In addition, it is assumed that, in the target 620, some of program codes which are necessary to perform the processing are missing.

In Step 63, if the target 620 is going to execute a portion where a program code is missing, a debug break is generated (a debug break command is embedded in advance at the head of a portion that is extracted from the program).

In Step 64, execution of the target 620 is interrupted, and a debug break event occurs, and the debug break event is notified to the host 610.

In Step 65-1, if the host 610 receives an event and the received event is a debug break event, the host 610 reads a value of a program counter of a process of the target 620, and embeds a part of the program code of the target 620, which is held in advance by the host 610, in a position indicated by the program counter of the program of the target 620.

In Step 65-2, the host 610 continues the process of the target 620. If the received event is an end event, the process proceeds to Step 36. Otherwise, the host continues the process of the target 620 without doing anything, and waits for a subsequent event.

In Step 65-3, since a command in the position where the break occurs is already replaced, the target 620 that has received an instruction of continuing execution from the host 610 continues the subsequent processing.

In addition, in Step 65-1, when the host 610 embeds a program code in a code region of the target 620, it may be necessary to set a page attribute of a target memory area to "Writable" (VirtualProtectEx( ) is performed in Windows, etc.).

In this exemplary embodiment, described is the case where the host 610 holds only a part of the program code of the program of the target 620. Of course, the host 610 may hold plural program codes. In that case, if the host 610 holds a set of address values and program codes to be embedded, the host 610 can specify which program code should be embedded by referring to the value of a program counter of the program of the target 620 when a debug break event has occurred.

In Step 65-3, when the host 610 writes the program code in the target 620 once, a debug break will never occur again in that position after the writing. Since this means that the host 610 becomes unnecessary, it is not preferable from the viewpoint of resistance against program analysis.

Thus, if the last part of the program of the target 620 that is written by the host 610 is set as a debug break command, when execution of a code where a process of the target 620 is embedded is finished, the last debug break is executed to generate a debug break event again, and then the event is notified to the host 610. When the host 610 side receives the event, it becomes possible to perform the processing that the previously embedded program code is erased from the target 620. In addition, the host 610 can discriminate as to whether a debug event should embed or erase a program code by referring to the value of the program counter of the process of the target 620. Otherwise, instead of the debug break command, a command that restores itself, i.e., a command that sets a debug break at a head and erases the remainder (zero clearing) may be put in the last part of a program that is written by the host 610.

Figure 8:
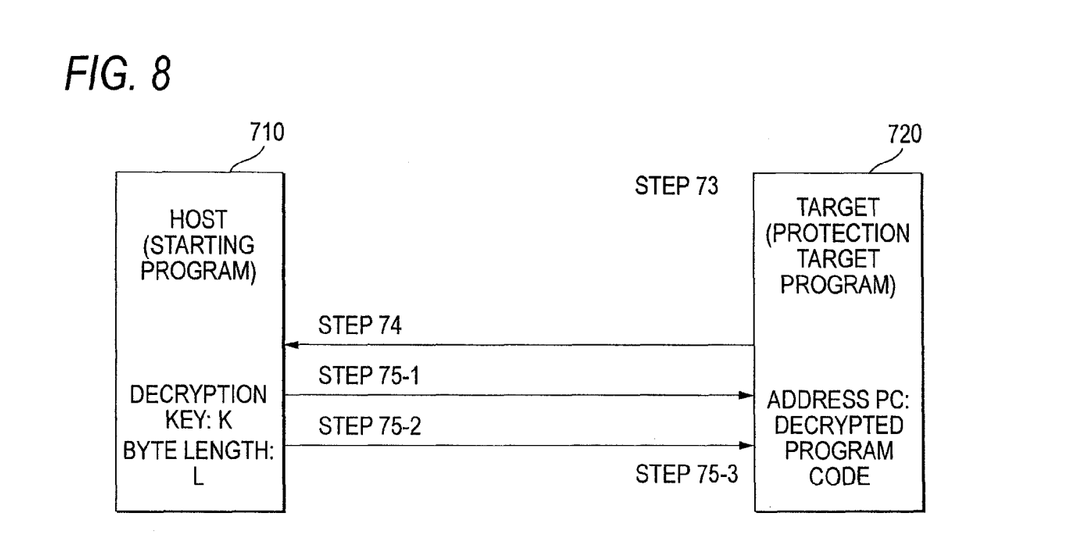
FIG. 8 is a block diagram showing an exemplary configuration of a fifth exemplary embodiment.

FIG. 8 shows a conceptual module block diagram of a fifth exemplary embodiment (an example where a host decrypts an encrypted program code of a target).

Here, a host 710 corresponds to the monitoring program 1200 of FIG. 3, and a target 720 corresponds to the protection target program 1300 of FIG. 3.

The fifth exemplary embodiment is an example in which a host decrypts a program code, a part of which is encrypted in advance, of the target. In the fifth exemplary embodiment, Steps 53 to 55-3 of the third exemplary embodiment are changed to the following Steps 73 to 75-3. Step 36 is also used in the fifth exemplary embodiment. In addition, it is assumed that a part of a program code on the target 720 side is encrypted in advance, and that the host 710 holds a decryption key for the encrypted part. Further, it is assumed that a debug break command is arranged at the beginning of encrypted program code. Encryption of a program can be realized by the existing techniques, such as Japanese Patent No. 3033562 and JP2005-18725 A.

In Step 73, if the encrypted program code part is to be executed, the target 720 executes a debug break command that is located just before the encrypted part, and generates a debug break. It is noted that the debug break command is not encrypted.

In Step 74, execution of the target 720 is interrupted, and a debug break event occurs, and the debug break event is notified to the host 710.

In Step 75-1, if the host 710 receives an event and the received event is a debug break event, the host 710 decrypts an "L" byte from a program counter part of the target 720 using a decryption key K for the program code of the target 720 that is held in advance by the host 710 and an encrypted byte length L. Then, the host 710 rewrite a command sequence in a memory of the target 720.

In Step 75-2, the host 710 increments a program counter by one so that a debug break command is not be repeated in a process of the target 720, and the host continues the process of the target 720. If the received event is an end event, the process proceeds to Step 36. Otherwise, the host continues the process of the target 720 without doing anything, and waits for a subsequent event.

In Step 75-3, since a command after the position where a break has already occurred is decrypted, the target 720 that has received an instruction of continuing execution from the host 710 continues the subsequent processing.

In Step 75-1, when the host 710 embeds a program code in a code region of the target 720, it may be necessary to set a page attribute of a target memory area to "Writable" similarly to the aforementioned example.

In this exemplary embodiment, described above is the case where the host 710 decrypts only a part of a program code of a program of the target 720. Of course, the host 710 may decrypt plural program codes. Further, a decryption key may be changed in every part to be decrypted, or an algorithm may be changed. In that case, a decryption key may be specified by referring to the value of a program counter of a program of the target 720 when a debug break event has occurred. Otherwise, similarly to the second exemplary embodiment in which the random number R is sent to the host, information such as a parameter, cryptographic algorithm, and an initial value, which specifies a decryption key, may be sent to the host 710 from the target 720. Further, the decryption processing is not performed by the host 710, but the host 710 may provide only a decryption key. The configuration in that case becomes the same as that of the third exemplary embodiment.

Moreover, similarly to the fourth exemplary embodiment, in Step 75-3, if the host 710 writes a program code in the target 720, a plaintext program code may be left in that position. Thus, the end of execution of an encrypted range is notified to the host to cause the host to perform re-encryption by embedding a debug break command at the last of the encrypted range. Further, although the case where a program code is adopted as an encryption target is described herein, data may be adopted as an encryption target.

Figure 9:
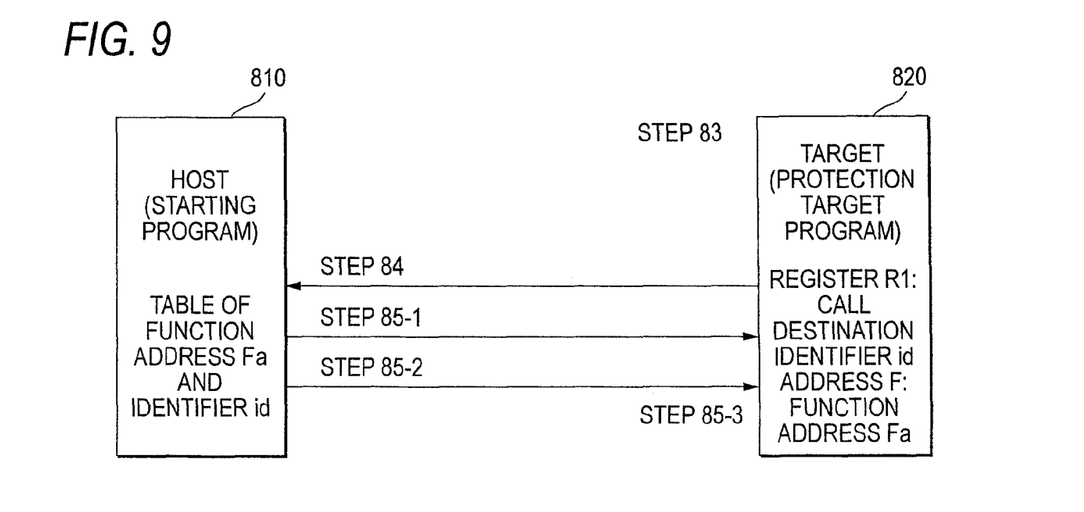
FIG. 9 is a block diagram showing an exemplary configuration of a sixth exemplary embodiment.

FIG. 9 shows a conceptual module block diagram of a sixth exemplary embodiment (an example in which a host holds function tables).

Here, a host 810 corresponds to the monitoring program 1200 of FIG. 3, and a target 820 corresponds to the protection target program 1300 of FIG. 3.

The sixth exemplary embodiment is an example in which a target executes a function call via function pointer as disclosed in JP2003-337629A, and if a program code is programmed so that the contents of the function pointer may be determined in a specific function, a host executes the processing of determining a function call destination.

In the fifth exemplary embodiment, Steps 53 to 55-3 of the third exemplary embodiment are changed to the following Steps 83 to 85-3. Step 36 is also used in the sixth exemplary embodiment. In addition, it is assumed that at least a part of a program code of the target 820 is programmed so that, when a function is called, the function is not directly called, but an address set in a certain function pointer may be called, and that, when a call destination is determined, a debug break is generated. Further, a host program has a correspondence table between function addresses in the target 820 and identifiers (numbers, etc.) representing the functions.

In Step 83, the target 820 stores a call destination parameter in a register R1 in a position where the call destination to be determined, and executes a debug break command to generate a debug break.

In Step 84, execution of the target 820 is interrupted, and a debug break event occurs, and the debug break event is notified to the host 810.

In Step 85-1, if the host 810 receives an event and the received event is a debug break event, the host 810 reads a value of the register R1 of the process of the target 820 and determines a destination corresponding to an identifier of the value from a list of call destinations of the target 820 that are held by the host 810 in advance. Then, the host 810 writes an address of the destination in a position of a memory address F in the process of the target 820.

In Step 85-2, the host 810 increments a program counter by one so that a debug break command is not be repeated in the process of the target 820, and the host continues the process of the target 820. If the received event is an end event, the process proceeds to Step 36. Otherwise, the host continues the process of the target 820 without doing anything, and waits for a subsequent event.

In Step 85-3, the target 820 that has received an instruction of continuing execution from the host 810 interprets that the address information stored in the address F is a function address, performs the function call of the address, and continues processing.

The exemplary embodiment is configured so that the host 810 writes determined address information in a memory of the target 820. However, the host 810 may directly rewrite a program counter of the program of the target 820. In this case, a return address from a function is set on a stack of the program of the target 820, if necessary.

Further, although the host 810 is adapted to determine a call destination, a function table itself may be sent to the target 820 and the target 820 may determine the call destination.

Figure 10:
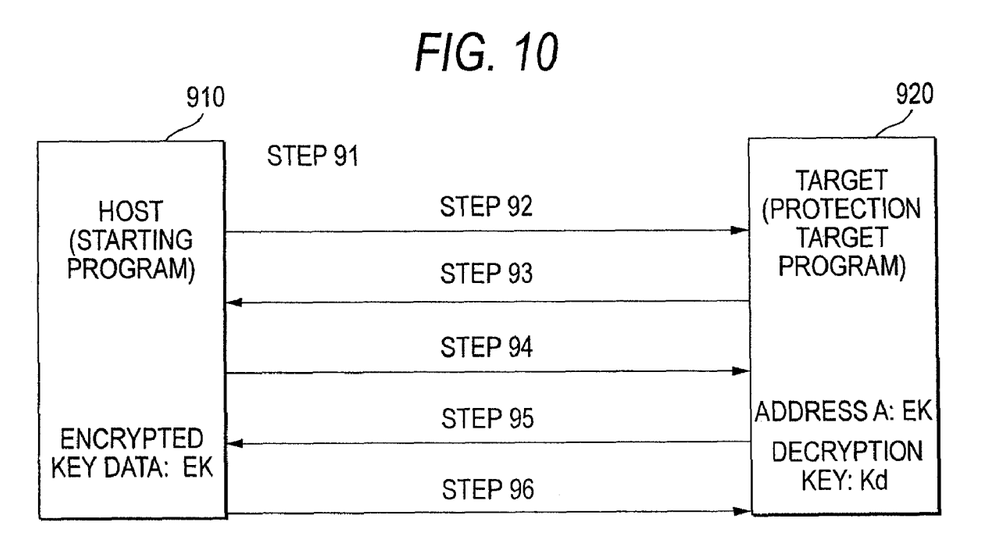
FIG. 10 is a block diagram showing an exemplary configuration of a seventh exemplary embodiment.

FIG. 10 shows the conceptual module block diagram of a seventh exemplary embodiment (an example where a target executes a portion of processing necessary for processing of a host).

Here, a host 910 corresponds to the monitoring program 1200 of FIG. 3, and a target 920 corresponds to the protection target program 1300 of FIG. 3.

All the previous exemplary embodiments are embodiments in which, in order to continue the processing of the target, the host supports the processing (the host side holds and processes a portion of data, a program, processing necessary for the target). However, as mentioned in the variation of the fifth exemplary embodiment, when the host holds a decryption key for decrypting a part of program codes of a target, the decryption key will be embedded in a host program. Since a key embedded in a program may be discovered by static analysis such as a dissembler, it is desirable to make it difficult to simply analyze.

Thus, in the seventh exemplary embodiment, a method in which the target provides some data, program, processing, etc. that is necessary for the host to continue processing is performed. For example, a decryption key of a target that is held by a host is further encrypted, and the target 920 perform decryption. In this way, if the host 910 does not borrow the assistance of the target 920, it is difficult to continue the processing. For example, unlike the previous exemplary embodiments, the host 910 serves as an application program that performs main processing and the target 920 serves as an auxiliary program.

The procedure of this exemplary embodiment will be described below. Data or a portion of a program on the host 910 is encrypted in advance with the encryption key K. It is assumed that the host 910 has only EK that is obtained by encrypting the encryption key K with a decryption key Kd that is a private key only known to the target 920.

In Step 91 the host 910 is started by a user.

In Step 92, the host 910 starts the target 920 as a debug target.

In Step 93, the target 920 is started with a suspended state, and the host 910 is notified of a debug event that a process has been created on one side.

In Step 94, if the host 910 receives the event, the host 910 writes data of the encrypted decryption key EK in an address A of the target, continues processing of the target 920, and waits for a subsequent event.

In Step 95, if the target 920 resumes execution, the target 920 reads encrypted key information from the address A, decrypts the key information with the decryption key Kd that is held by itself, writes the resultant encryption key K in the address A again, and executes a debug break.

In Step 96, if the host 910 receives the debug event, the host 910 receives the decrypted result by referring to the contents of the address A of the target 920. Thereafter, the execution is continued by decrypting the encrypted data and encrypted program in the host 910, with the encryption key K.

An example in which the host 910 requests the target 920 for processing only when initialization processing is performed is described herein. However, the target 920 may be caused to wait in a suspended state after Step 96 and, if necessary, the host 910 may perform processing after Step 94. In this case, contents of processing to be requested to the target 920 are written in an address or register of the target 920, and then processing of the target 920 is continued and the target executes designated processing. Then, the target 920 returns a value to the host 910. Thereby, the host 910 can call a necessary function on the target side at an arbitrary timing. Although the processing mentioned here is an example of providing an encrypting key, arbitrary processing may also be performed by the target 920.

Further, this exemplary embodiment may be combined with any one of the above-mentioned second exemplary embodiment. For example, it is assumed that this exemplary embodiment is combined with the third exemplary embodiment. In this case, if another data is decrypted with the encryption key K obtained in Step 96, a key to decrypt the encrypted code in the target 920 is obtained, and this key is supplied to the target 920.

Figure 11:
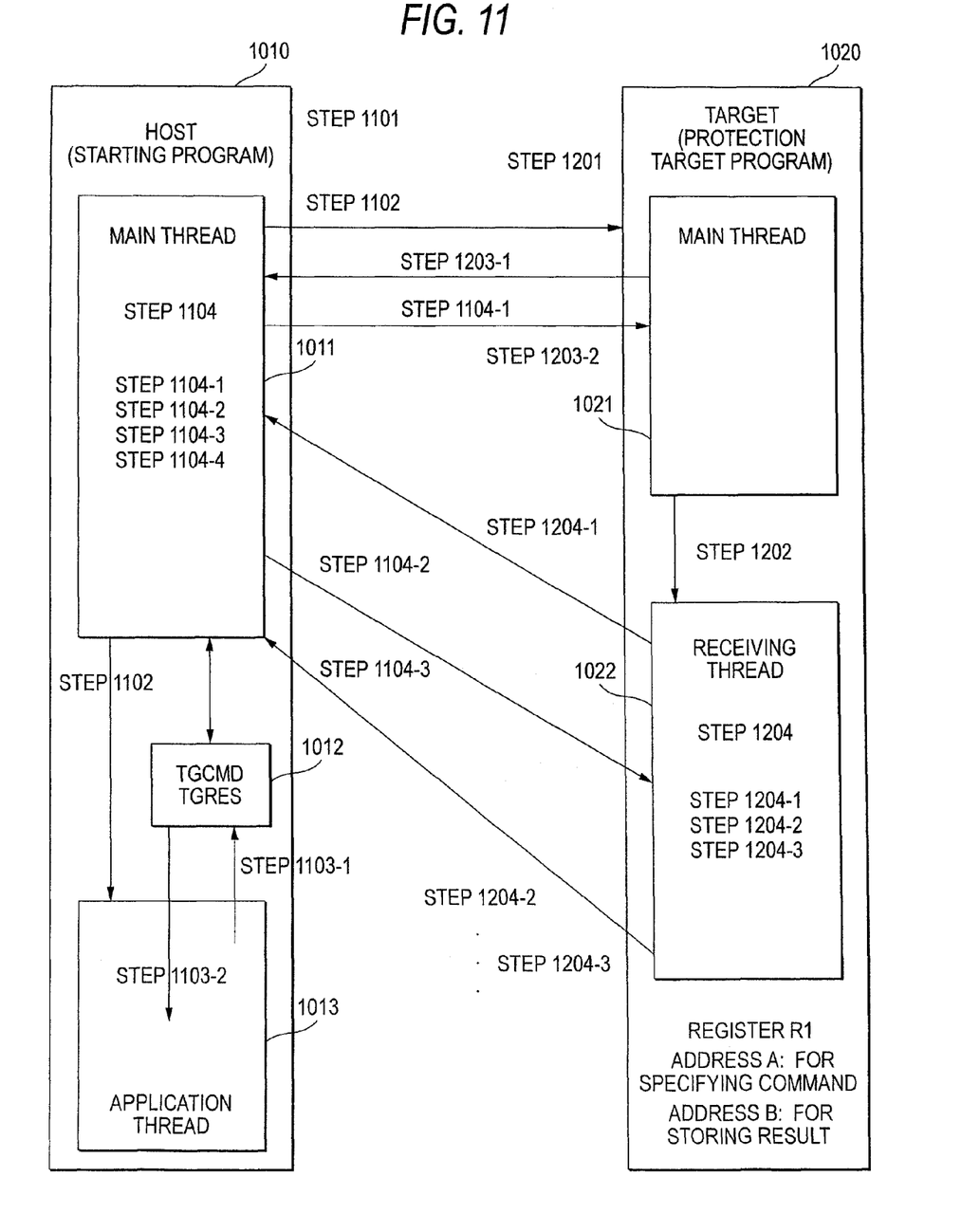
FIG. 11 is a block diagram showing an exemplary configuration of an eighth exemplary embodiment.

FIG. 11 shows a conceptual module block diagram of an eighth exemplary embodiment (an example where a host and a target cooperate to execute an encrypted code).

Here, a host 1010 corresponds to the monitoring program 1200 of FIG. 3, and a target 1020 corresponds to the protection target program 1300 of FIG. 3.

The eighth exemplary embodiment is obtained by combining the fifth exemplary embodiment with the seventh exemplary embodiment. In the fifth exemplary embodiment, the target requests the host for processing at an arbitrary timing, and receives a code as a decrypted code. The fifth exemplary embodiment is combined with the seventh exemplary embodiment in which the host requests a target for processing at an arbitrary timing.

The procedure of this exemplary embodiment will be described below. Since the procedure is complicated, the procedure will be described with divided into a host 1010 side and a target 1020 side.

First, the processing on the host 1010 will be described.

In Step 1101, the host 1010 is started by a user.

In Step 1102, the host 1010 starts the target 1020 as a debug target, and creates an application thread 1013 that performs main processing of the host 1010. In a main thread 1011, the processing that receives a debug event is performed.

In Step 1103-1 (the processing in the application thread 1013), the application thread 1013 continues original processing of the host 1010. When processing of the target 1020 is to be called, a command for the target 1020 is written into a command variable TGCMD of the host 101, and then an event that the value is written in a command result variable TGRES of the host 1010 is waited for.

In Step 1103-2 (the processing in the application thread 1013), if a value is written in the command result variable TGRES, the application thread 1013 continues processing by referring to this value. Thereafter, Steps 1103-1 to 1103-2 are repeated when necessary.

In Step 1104, a debug event is received, and a request of the target 1020 is processed or a processing request is given to the target 1020 according to the value of the register R1. Specifically, the processing of the following Steps 1104-1 to 1104-4 is performed.

In Step 1104-1 (the processing of the main thread 1011), the main thread 1011 waits for a debug break event. When this event occurs, the content of a register R1 of the target 1020 is referred to. If a value in the register R1 is a specific value (for example, 0xFFFFFF01), the main thread 1011 determines that the value is a processing request from the target 1020. Then, the main thread 1011 reads a memory state of the target 1020 (for example, the content of a memory address A (for specifying a command)), and executes processing. Then, the main thread 1011 writes the result in the target 1020 (for example, writes in a memory address B (for storing the result)), thereby causing the target 1020 to continue.

In Step 1104-2 (the processing of the main thread 1011), when the content of the register R1 is another specific value (for example, 0xFFFFFF02), the main thread 1011 determines that the value of the register R1 is processing reception from the target 1020. Then, the command variable TGCMD of the host 1010 is referred to. If a command is written in the variable, the main thread 1011 writes the command in a memory of the target 1020, thereby continuing the processing. If the TGCMD is empty, the main thread 1011 does nothing and causes the processing of the target 1020 to continue.

In Step 1104-3 (the processing of the main thread 1011), when the content of the register R1 is still another specific value (for example, 0xFFFFFF03), the main thread 1011 determines that the value of the register R1 is a processing result notification from the target 1020. Then, the main thread 1011 reads the value of a specific memory in the target 1020, and writes the read value in a command result variable TGRES of the host 1010, thereby causing the processing of the target 1020 to continue.

In Step 1104-4 (the processing of the main thread 1011), when the content is not any of the above ones, the processing of the target 1020 is continued if an end event of the target 1020 does not occur, and the host 1010 is also finished if the end event occurs.

A procedure on the target 1020 will be described below.

In Step 1201, the target 1020 is started by the host 1010.

In Step 1202, the target 1020 creates a thread (receiving thread 1022) for receiving a command from the host 1010.

In Step 1203-1 (processing of a main thread 1021), the main thread 1021 continues processing. Then, when the receiving thread 1022 wants to call the host 1010, the receiving thread 1022 writes the value 0xFFFFFF01 in the register R1, and also writes content of a processing request for the host 1010 in a specific memory area, thereby generating a debug break event.

In Step 1203-2, since a processing result from the host 1010 is supposedly written in the memory area when the processing is continued, the processing result is read, thereby continuing the processing. Thereafter, Steps 1021-1 to 1103-2 are repeated as needed.

The command of the host 1010 is processed while a debug event is generated regularly. Specifically, the processing of the following Steps 1204-1 to 1204-3 is performed.

In Step 1204-1 (processing of the receiving thread 1022), the receiving thread 1022 writes 0xFFFFFF02 in the register R1 at constant intervals (for example, 50 msec, etc.), thereby generating a debug break event.

In Step 1204-2 (the processing of the receiving thread 1022), if a specific memory area is not empty, the receiving thread 1022 determines that a value of the memory area is a command (processing request content) from the host 1010, thereby performing the corresponding processing. Then, the receiving thread 1022 writes a processing result in another memory area, and writes 0xFFFFF03 in the register R1, thereby creating a debug break event. If the specific memory area is empty, anything will be not performed.

In Step 1204-3 (the processing of the receiving thread 1022), the processing from Step 1204-1 is repeated.

A ninth exemplary embodiment (an example where a target detects a debug state of a host) will be described.

Since the case where only a target serves as a debuggee is described in the previous exemplary embodiments, an act that analyzes the host by a debugger cannot be prevented. Thus, the target regularly checks as to whether or not the host is debugged, and if it is detected that the host is debugged, the execution may be stopped promptly. An example of processing will be described below.

(A) The processing on the host side is shown below.

(1) Start a target as a debuggee. At this time, send a process ID of the target as an argument.

(2) Wait for a debug event from the target. This step (2) is repeated so long as an end event has not occurred.

(B) The processing on the side of the target is shown below.

(1) Create a thread that checks as to whether or not a process having the sent process ID as an argument is debugged. The thread performs the processing of (2). A main thread continues original processing (functions of an application) of the target. In Windows, it may be detected that an API "CheckRemoteDebuggerPresent( )" is used or a process of a main debugger (Visual Studio, etc) is started.

(2) Check regularly (for example, every one minute) as to whether or not a process having a specific process ID is debugged. If it is detected that the process is debugged, finish the processing of the target itself. Otherwise, repeat (2).

By doing so, if the host is debugged, a target can detect that the host is debugged, and end a program.

A tenth exemplary embodiment (an example of a multi-stage configuration) will be described.

The multi-stage configuration is a configuration for preventing an act that analyzes a host by a debugger. The tenth exemplary embodiment is configured multi-stages by providing a parent host for a host, and further providing a grandparent host for the parent host.

In this case, various configurations of the exemplary embodiments described hitherto are combined together in the dependence relationship between a host and its low-level target.

An eleventh exemplary embodiment (an example where a host and a target cooperate as debuggers) will be described.

The eleventh exemplary embodiment is configured so that a relationship between a host and a target becomes symmetrical (one serves as a host and a target for the other, and vice versa). Steps will be described below.

(A) Processing on the host side (1) Start a target as a debuggee. At this time, send own process ID as an argument.

(2) Create a thread that performs processing to be originally performed by the host.

(3) Wait for a debug event from the target. Repeat this step (3) so long as an end event does not occur.

(B) Processing on the target side (1) Attach as a debugger to the process ID sent as an argument. Compulsorily terminate a process having the sent process ID, and terminate the target itself if the attachment is in failure.

(2) Wait for a debug event from the host. Repeat this step (2) so long as an end event does not occur.

By doing so, both the processes serve as debuggers for each other. Thus, debug from the outside becomes impossible entirely. In this case, the host performs the "original processing that is to be provided by an application." However, this process may be performed on the target side or may be performed on the both sides.

Also, in this exemplary embodiment, the host and the target operate as debuggers for each other. However, if the dependence relationship between the host and the target is created like the previous exemplary embodiments, it would be further difficult for an attacker to analyze.

An twelfth exemplary embodiment (an example concerning the configuration of modules) will be described.

If a host and a target are separate files and they exist in the same folder, there is a possibility that the correspondence relationship therebetween may be guessed. Thus, the files are integrated as a single module, and the operation of the host and the operation of the target are switched to each other by a starting option. Here, the "option" is, for example, one that is designated by adding a hyphen (-) after the name of a command and that allows to select processing executed by the command.

A thirteenth exemplary embodiment (an example where the debugger/debuggee relationship between a host and a target is switched at certain intervals) will be described.

As an API that makes a pair with an API serving as a debugger that attaches to an active process afterwards, there is an API that detaches the debugger. There is also a method of switching the relationship between a debugger and a debuggee every certain timing, using this API. For example, in a state where a host starts a target and operates as a debugger of the target, switching can be made as follows.

(1) On the target side, a debug break that means debugger switching is generated by putting a specific value in a register at constant intervals. The target suspends execution promptly.

(2) When a host receives a debug event and determines that the received event is debugger switching, the host detaches from the target while operation of the target is caused to continue.

(3) When the target has resumed its operation, the target checks that the target is not being debugged (check as to whether or not FALSE is returned from IsDebuggerPresent( ) and DebugActiveProcessStop( ) in Windows). Then, the target attaches to the host and waits for a debug event from the host.

(4) If the host waits for the event for a fixed time, the host generates the same debugger break for debugger switching as in (1). The host suspends execution.

(5) When the target receives a debug event and determines that the event is debugger switching, the target detaches from the host while operation of the host is caused to continue.

(6) When the host has resumed its operation, the host checks that the host is not being debugged. Then, the host attaches to the target and waits for a debug event from the target.

(7) The above steps (1) to (6) are repeated.

In addition, when control is passed from the target to the host, various exceptions (debug event caused by an error) may be generated, in addition to the aforementioned break event.

Plural exceptions that execution cannot be normally continued so long as a debugger does not exist, such as division by 0 that is an exception ordinarily generated within a process of a target only at the time of occurrence of an error, and access violation, are generated (within a loop, etc.).

The host grasps where an exception has occurred. Thus, if an exception has occurred, a cause of occurrence of the exception in the process of the target is corrected (a program counter is incremented or the content of a register or a memory is rewritten), and the host continues its processing. This makes it impossible to be executed by the target only.

In addition, variations of the starting method may be made as follows.

The case where the host is first started and the target is started as a debuggee by the host is described in the previous exemplary embodiments. However, there is also another configuration in which, after a target is ordinarily started, the target starts the host by using its own process ID as an argument, thereby attaching the host to the target.

In addition, the notification (debug event) from the target (debuggee) to the host (debugger) may be exemplified as follows.

The debug events may be generated, for example, when a process/thread has been created/finished, when an exception (access violation, etc.) has occurred, when a DLL (Dynamic Linking Library) has been loaded/unloaded, and/or when a debugging character string has been output. Any of them can be used to notify the host of a processing request from a target. In particular, an output of a debugging character string can send a parameter for the host as a character string.

In addition, a method of notification from a host (debugger) to a target (debuggee) may be exemplified as follows.

When a host calls a target, there are the following two methods in the previous embodiments.

(1) A method in which the target side regularly generates a debug break, and if there is a command at that timing, the host side writes the content of a processing request in a memory in a target process.

(2) A method in which, when the target side is caused to stand by in a suspended state if there is no need, and when the host side needs, the content of a processing request is written in a memory within a process on the target side, thereby resuming processing.

Besides them, there is also another method in which the host side compulsorily interrupts processing of a target depending on the kind of APIs that are supported by an OS (a signal is sent by an API "DebugBreakProcess( )" in the case of Windows, and a signal is sent by an API "kill( )" in the case of a Unix® system).

An example of the processing using this method will be described below.

(1) Prepare a thread that waits request processing for the target side.

(2) A host compulsorily interrupts the target.

(3) The host writes the content of a request in a specific memory within the target to resume a process.

(4) If the target has been finished, the target generates a debug break. Otherwise, a result is written in another memory area.

(5) The host waits for a debug break, or monitors a region in which the result of the target is written, and receives a result.

Figure 12:
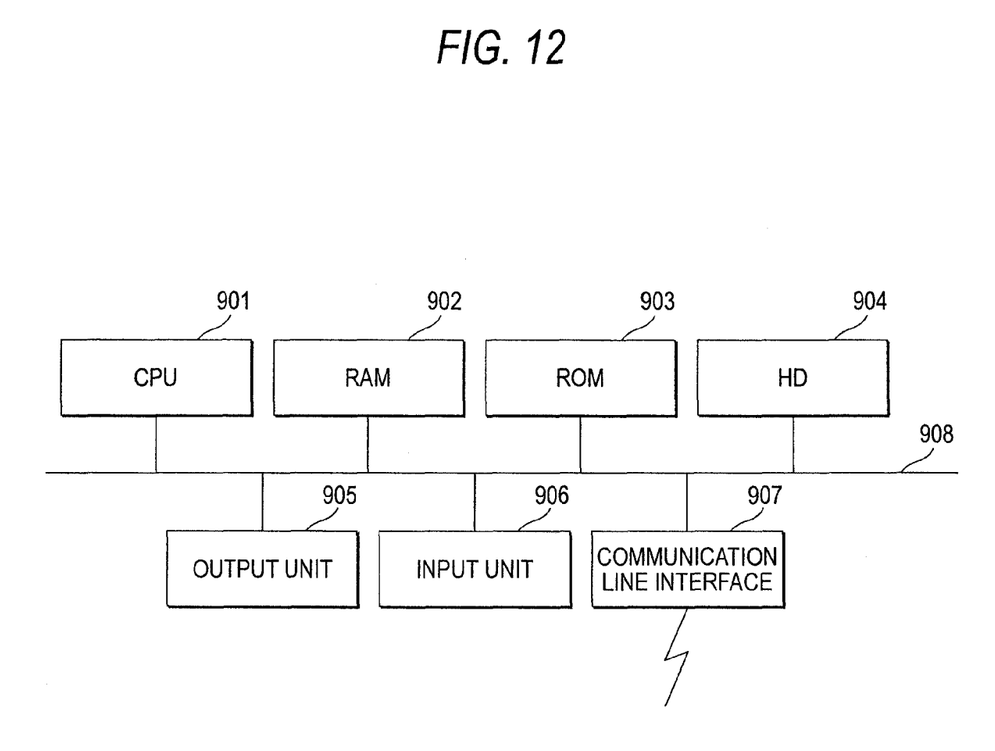
FIG. 12 is a block diagram showing a hardware configuration of a computer that realizes the exemplary embodiments.

In addition, a hardware configuration of a computer to be executed by a program as the exemplary embodiment is executed, as shown in FIG. 12, is a general computer, and specifically, a personal computer on which various kinds of application software are installed. In the exemplary embodiment, the application software becomes mainly the protection target program 1300, etc. The exemplary embodiment is constituted by a CPU 901 that executes programs, such as the protection target program 1300 and the monitoring program 1200 that makes a pair with the protection target program 1300, a RAM 902 that stores the programs or data, a ROM 903 in which programs for starting the computer are stored, an HD 904 that is an auxiliary storage device, an input unit 906 that inputs the data of a keyboard, a mouse, etc., an output unit 905, such as a CRT or a liquid crystal display, a communication line interface 907 for connection with a communication network, and a bus 908 for connecting the above components with one another and exchanging data. A plurality of the computers may be connected with one another by a network.

In addition, the hardware configuration shown in FIG. 12 is an exemplary configuration, and the exemplary embodiment is not limited to the configuration shown in FIG. 12. Any configurations may be adopted if only they can execute the modules described in the exemplary embodiment. For example, some of modules may be constituted by exclusive hardware (for example, ASIC, etc.). In particular, the modules may be incorporated into cellular phones, game machines, car navigation systems, information appliances, copying machines, facsimiles, scanners, printers, composite machines (also called multifunctional copying machines having functions, such as scanners, printers, copying machines, and facsimiles), etc. besides the personal computer.

In addition, the above-described programs can be stored in a recording medium. In that case, for example, the above-described programs can also be grasped as inventions of "computer-readable recording media on that programs are recorded."

The expression "computer-readable recording media on that programs are recorded" means recording media on that programs that can be read by a computer are recorded, and that are used for installation or execution of programs, distribution of programs, etc.

In addition, the recording media includes, for example, digital versatile disks (DVDS), such as DVD-Rs, DVD-RWs, and DVDLRAMs, that are standards formulated in a DVD forum, and such as DVD+Rs and DVD+RW, that are standards formulated in a DVD+RW party, compact disks (CD), such as read-only memories (CD-ROMs), CD-recordables (CD-Rs), and CD-rewritables (CD-RWs), magneto-optic disks (MOs), flexible disks (FDs), magnetic tapes, hard disks, read-only memories (ROMs), electrically erasable programmable read-only memories (EEPROMs), flash memories, random access memories (RAMs), etc.

Also, the above programs or some of the programs can be saved or distributed in a state where they are recorded on the above recording media. Further, the above programs can be transmitted by communication, for example, using transmission media, such as local area networks (LANs), metropolitan area networks (MANs), wide area networks (WANs), and wired networks, wireless communication networks, or combined networks thereof that are used for the Internet, intranets, extranets, etc. Further, the above programs can also be delivered on a carrier.

Furthermore, the above programs may be portions of other programs, or may be recorded on recording mediums along with a separate program.

What is claimed is:

1. A non-transitory computer-readable medium storing a program causing a computer, in which only one process can monitor a process, to execute information processing, the information processing comprising:
    starting a monitoring program;
    starting, by the monitoring program, a protection target program or, if the protection target program is already started, attaching to the protection target program;
    monitoring, by the monitoring program, the protection target program;
    intermittently checking, by the protection target program, for the presence of the monitoring program;

if the monitoring program is not present, terminating the protection target program, wherein the monitoring program prevents the protection target program from being monitored by a third-party monitoring program;

releasing, by the monitoring program, the monitoring of the protection target program; and restarting, by the protection target program, monitoring by the monitoring program.

2. The computer-readable medium according to claim 1, wherein the monitoring program is monitored by another monitoring program.

3. The computer-readable medium according to claim 1, wherein:

the monitoring program and the protection target program are integrated as one module, and the monitoring program or the protection target program is started according to an argument at a time at which the one module is started.

4. The computer-readable medium according to claim 1, wherein the information processing further comprises:

checking, by the protection target program, whether the monitoring program is monitored by the third-party monitoring program.

5. An information processing system, in which only one process can monitor a process, the information processing system comprising:

a monitoring program starting unit that is configured to, when a protection target program to be protected is started, start, using at least one central processing unit, a monitoring program that monitors the protection target program;

a protection target program monitoring unit that is configured to cause the protection target program to be monitored by the monitoring program;

a checking unit that that is configured to intermittently check if the monitoring program is present and to terminate the protection target program if the monitoring program is not present, wherein the monitoring program prevents the protection target program from being monitored by a third-party monitoring program;

releasing, by the monitoring program, the monitoring of the protection target program; and restarting, by the protection target program, monitoring by the monitoring program.

\* \* \* \* \*